(12) United States Patent
Natiuk et al.

(10) Patent No.: US 11,482,120 B2
(45) Date of Patent: Oct. 25, 2022

(54) RENDERING LAYERS OF AIRSPACE MAP FOR UNCREWED AERIAL VEHICLE FLIGHT PLANNING

(71) Applicant: Verizon Patent and Licensing Inc., Basking Ridge, NJ (US)

(72) Inventors: Jonathan R. Natiuk, Camas, WA (US); Amie Kuttruff, Portland, OR (US); Alexei P. Yagolnikov, Vancouver, WA (US); Tariq M. Rashid, Jacksonville, FL (US); John William Fahey, Portland, OR (US); Gregory Bauwens, Portland, OR (US); Leah Brady, Portland, OR (US); James Paul Smith, Damascus, OR (US); Shane Williams, Monument, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 155 days.

(21) Appl. No.: 16/929,388

(22) Filed: Jul. 15, 2020

(65) Prior Publication Data
US 2022/0020276 A1 Jan. 20, 2022

(51) Int. Cl.
*G08G 5/00* (2006.01)
*G06T 11/60* (2006.01)
*G06T 11/00* (2006.01)

(52) U.S. Cl.
CPC ............ *G08G 5/006* (2013.01); *G06T 11/001* (2013.01); *G06T 11/60* (2013.01); *G08G 5/0034* (2013.01); *G08G 5/0069* (2013.01)

(58) Field of Classification Search
CPC combination set(s) only.
See application file for complete search history.

(56) References Cited

U.S. PATENT DOCUMENTS

| | | | |
|---|---|---|---|
| 2020/0026720 A1* | 1/2020 | Liu | G05D 1/101 |
| 2020/0051443 A1* | 2/2020 | Zhao | G08G 5/0039 |
| 2020/0074869 A1* | 3/2020 | Root | G08G 5/0017 |
| 2020/0250997 A1* | 8/2020 | Hegranes | G08G 5/0039 |
| 2022/0012943 A1* | 1/2022 | Cieplinski | G06T 17/10 |

* cited by examiner

*Primary Examiner* — Wesner Sajous

(57) ABSTRACT

A device includes a processor. The processor is configured to execute instructions to receive first operator input and generate layers for a map based on the first operator input. The layers include features to indicate whether an Uncrewed Aerial Vehicle (UAV) operator should or could fly a UAV in an airspace corresponding to an area within the map. The processor is also configured to receive second operator input that specifies a path on the map, for a UAV flight.

20 Claims, 18 Drawing Sheets

RENDERING LAYERS OF AIRSPACE MAP FOR UNCREWED AERIAL VEHICLE FLIGHT PLANNING

BACKGROUND INFORMATION

Some types of Uncrewed Aerial Vehicles (UAVs), are flown remotely by a program or a human pilot. Whether a UAV is flown by a human pilot or by a program, its flight needs to be planned by a UAV operator who is concerned with data that is different from those of in-vehicle pilots. For example, a UAV operator may be concerned with receiving communications from the Low Altitude Authorization and Notification Capability (LAANC) system within the Federal Aviation Administration (FAA). Through the LAANC system, the FAA can grant authorizations for many operations for UAVs in near-real time. The LAANC system is important to UAV operators with access to controlled airspace at or below 400 feet Above Ground Level (AGL).

DETAILED DESCRIPTION OF PREFERRED EMBODIMENTS

Figure 1:
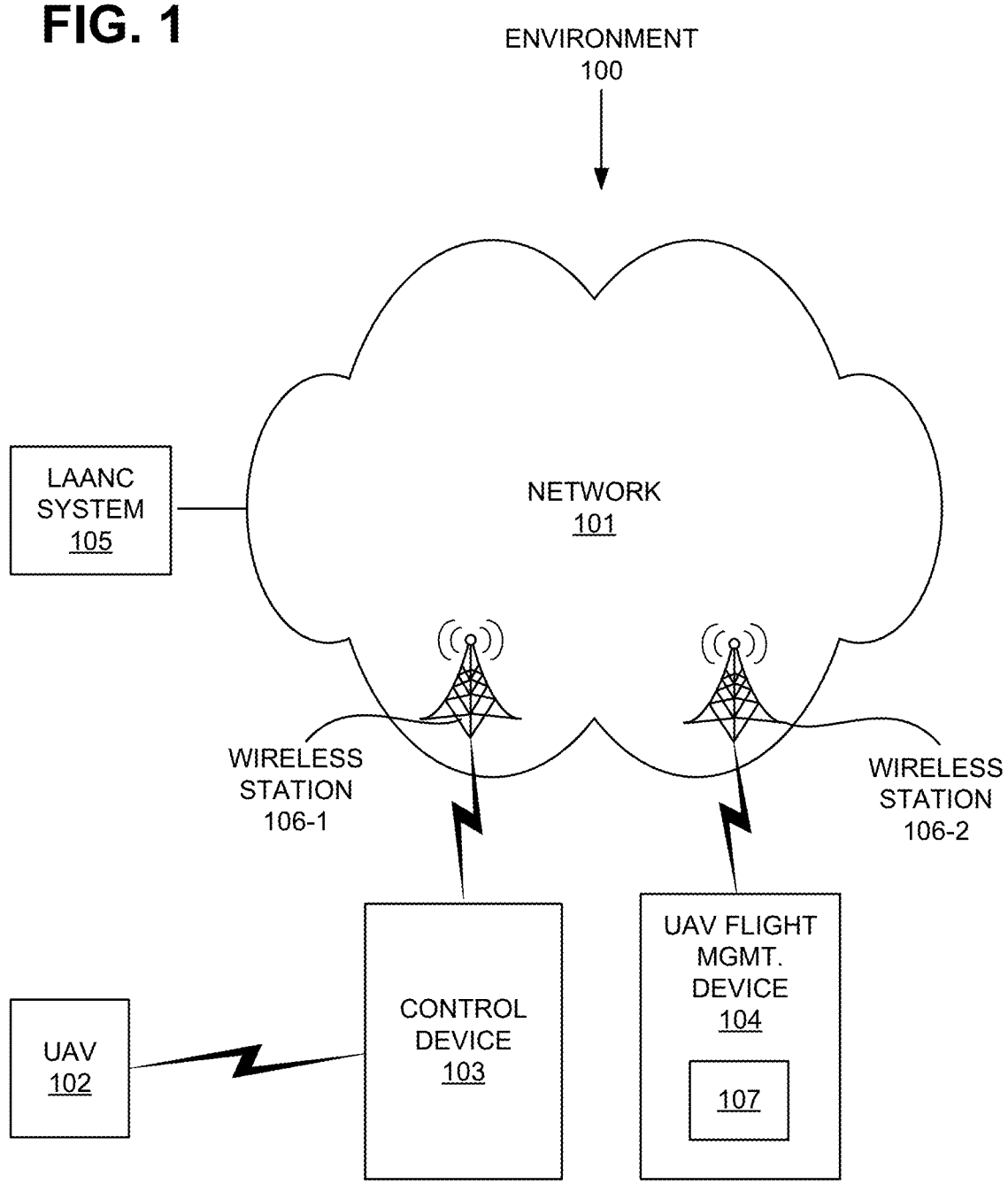
FIG. 1 illustrates an exemplary environment in which systems and methods described herein may be implemented.

The following detailed description refers to the accompanying drawings. The same reference numbers in different drawings may identify the same or similar elements.

The systems and methods described herein relate to rendering maps for an Uncrewed Aerial Vehicle (UAV) or Uncrewed Aircraft System (UAS), as part of a user interface for UAV control applications. As used herein, the term "uncrewed" may be interpreted to have a similar meaning as "unmanned."

Traditionally, maps that depict airspaces do so from the point of view of crewed aircraft pilots. There are several sets of data that these maps prioritize: classes of controlled airspace (B, C, D, E); altitudes of airspace (e.g., the highest point of the ground within a section Above Ground Level (AGL)); airport locations and radio contact information; Federal airways; navigation routes; radio aids to navigation; Temporary Flight Restrictions (TFRs); obstructions (e.g., radio towers, wind turbines, etc.). For UAV operators, some of the data from these traditional aeronautical maps are not important, and, therefore are not needed to be displayed. Conversely, some data that is unimportant to crewed aviation and would typically not be provided in an aeronautical map would be of great value to a UAV operator.

For example, because UAV flights are limited to below 400 feet in altitude above ground level (AGL) (without a waiver), aviation map features that are applicable to anything above 400 feet AGL are of lesser importance to most UAV operators and therefore need not be shown on a map. Examples of features that may not be relevant to UAV missions include: altitudes of airspace areas; the highest point of the ground within a section; Federal airways and navigation routes; radio aids to navigation; and high-elevation obstructions (e.g., radio towers, wind turbines, etc.). Rather than rendering maps based on traditional crewed aircraft patterns, the systems and methods disclosed herein relate to rendering each of the features based on relevance to UAV operation—whether the rendered features help UAV operators answer the questions, "Can I fly here?" and to a lesser extent, "Even if I can fly here, should I?" pertaining to a degree of navigability. Accordingly, the systems and method described herein render features in map "layers" based on UAV flight restrictions. These features may include: LAANC gridlines and areas, TRFs, flight obstacles, powerlines, pedestrian paths, three-dimensional (3D) renderings, and airport runway markings. Handling of these features by the system are described in greater detail below with reference to FIGS. 3A-12. By limiting the rendering of features to those relevant to UAV operation, a more understandable view of UAV operational limitations may be presented to an operator. Features may be presented as map layers to allow different features to be included depending on desirability for a particular geography or mission. Also, features may be combined in rendering to make the visualization more comprehensible. Further examples and benefits are described below.

FIG. 1 illustrates an exemplary environment 100 in which the systems and the methods described herein may be implemented. As shown, environment 100 may include a network 101, an Uncrewed Aerial Vehicle (UAV) 102, a UAV control device 103, a UAV flight management device 104, and a Low Altitude Authorization and Notification Capability (LAANC) System 105.

Network 101 may include a local area network (LAN), a wide area network (WAN), a metropolitan area network (MAN), an optical network, a cable network, a satellite network, a wireless network (e.g., a CDMA network, a general packet radio service (GPRS) network, a Long-term Evolution network (e.g., a Fourth Generation (4G) network), a Next Generation (e.g., a Fifth Generation (5G) network), an ad hoc network, a telephone network (e.g., the Public Switched Telephone Network (PSTN), an intranet, or a combination of networks. Network 101 may allow the delivery of Internet Protocol (IP) services to UAV 102, control device 103, management device 104, LAANC system 105, and may interface with other networks.

Network 101 may permit control device 103, management device 104, and LAANC system 105 to communicate with one another. To do so, network 101 may establish and maintain over-the-air channels with devices 103 and 104; and maintain backhaul channels with other components (e.g., core networks) within network 101. Network 101 may convey information through these and other channels, among devices 103 and 104, and LAANC system 105.

For wireless communications, network 101 may include many wireless stations, which are illustrated in FIG. 1 as wireless stations 106-1 and 106-2. In FIG. 1, wireless stations 106-1 and 106-2 are shown as maintaining over-the-air channels with control device 103 and management device 104.

Depending on the implementation, wireless stations 106 may include a 4G, 5G, or another type of wireless station (e.g., eNB, gNB, etc.) that includes one or more radio frequency (RF) transceivers. Wireless stations 106 may include hardware and software to support one or more of the following: carrier aggregation functions; advanced or massive multiple-input and multiple-output (MIMO) antenna functions; Machine-Type Communications (MTC)-related functions, such as 1.4 MHz wide enhanced MTC (eMTC) channel-related functions (i.e., Cat-M1), Low Power Wide Area (LPWA)-related functions such as Narrow Band (NB) Internet-of-Thing (IoT) (NB-IoT) technology-related functions, and/or other types of MTC technology-related functions; Dual connectivity (DC), and other types of LTE-Advanced (LTE-A) and/or 5G-related functions. In some implementations, wireless stations 106 may be part of an evolved UMTS Terrestrial Network (eUTRAN).

UAV 102 may include an aircraft (e.g., a single rotor aircraft, multirotor aircraft or fixed wing aircraft) that exchanges signals with control device 103. For example, the rotational speed of each rotor for a multirotor UAV 102 may be adjusted individually via signals from control device 103 to maneuver UAV 102 based on the particular flight goals.

Control device 103 may be used by a UAV operator or be programmed to direct the flight of UAV 102. In some implementations, control device 103 may receive flight-related information from management device 104 over network 101, while in other implementations, control device 103 may be a stand-alone device. In some implementations, UAV 102 may be capable of communicating over 4G, 5G, or another type of network, and in such implementations, control device 103 may control UAV 102 over network 101 through network 101's wireless channels, rather than through a direct RF communication with UAV 102.

UAV flight management device 104 may create flight plans based on input from a UAV operator (also referred to as a user) or based on remote Application Programming Interface (API) calls from another system. To create a flight plan at management device 104, for example, a UAV operator may launch a management application 107 (installed on device 104) that presents the user with a graphical user interface (GUI) to receive information needed for planning a UAV flight (e.g., a time of the flight, an identifier associated with a UAV, a customer ID, a launch point of the UAV, etc.). After receipt of the information, application 107 may create a database entry (e.g., in a cloud or at device 104) corresponding to the flight plan. A UAV pilot, the operator, or yet another authorized personnel may retrieve the plan, to obtain information recorded in the database.

During the creation of a flight plan, management application 107 may present a UAV operator with an interactive aerial map. The aerial map can be viewed at different zoom levels, and at each zoom level, may display layers of features relevant for planning a flight. To allow UAV operators to easily understand the features and therefore, to effectively chart flight paths, management application 107 renders the layers in a manner that facilitates comprehension. In implementations described herein, management application 107 is designed to render the layers so that the UAV operator can easily perceive UAV airspace navigability, as further explained below with reference to FIGS. 3A-12. Once the UAV operator charts the flight and if the flight requires an authorization from the Federal Aviation Administration (FAA), management application 107 may send a request, over network 101, to LAANC system 105 to obtain authorization for the flight. LAANC system 105 may respond with a denial, a grant, or a conditional grant (i.e., requires additional approval).

To render the aerial map, management application 107 may access a local or remote database (e.g., a cloud-based database) that is maintained by a program/script. In maintaining the data database, the program collects different data sets from various sources, such as Federal Aviation Administration, SkyVector™, Skyward™, Aeronautical Information Exchange Model (AIXM), LAANC system, etc. The collected data sets may provide information on: Class Airspace, airspace schedule, UAS Facility Maps (e.g., provided by LAANC system), National Security UAS Flight Restrictions, special use airspace, special flight rules areas, national parks, stadiums, airports, power plants and power lines, and vertical obstacles, etc.

The program may retrieve the data sets from the sources at regular time intervals (e.g., 15 minutes, every day, every week, etc.) depending on the source. After each collection, the program automatically transforms the collected data sets (which may be in different formats) into a display-friendly format that can be easily rendered.

In some implementations, prior to the transformation, the program may add metadata and/or may convert data descriptions (which is also part of the collected data) into a human-readable format. Next, the program may combine the collected/transformed data sets that are similar. In addition, for each of the data sets, data which represent similar/same geometries (e.g., a data set from LAANC system 105) are combined using a union process, so that they are easier to read for the UAV operator (or another type of end user). Applying the union process to a data set may result in a smaller data set. After the data sets are combined and transformed into the display-friendly format, they are automatically uploaded to the database.

LAANC system 105 may include one or more devices for communicating with UAV management device 104; receive online requests for low-altitude flight authorization for particular airspaces; and grant or deny authorizations to UAV management device 104. LAANC system 105 may be capable of granting authorizations for many flight requests for UAVs in airspaces at or below 400 feet AGL in near-real time.

For simplicity, FIG. 1 does not show all components that may be included in environment 100 (e.g., routers, bridges, wireless access point, additional networks, additional UAVs, UAV management devices, control devices, etc.). That is, depending on the implementation, environment 100 may include additional, fewer, different, or a different arrangement of components than those illustrated in FIG. 1.

Figure 2:
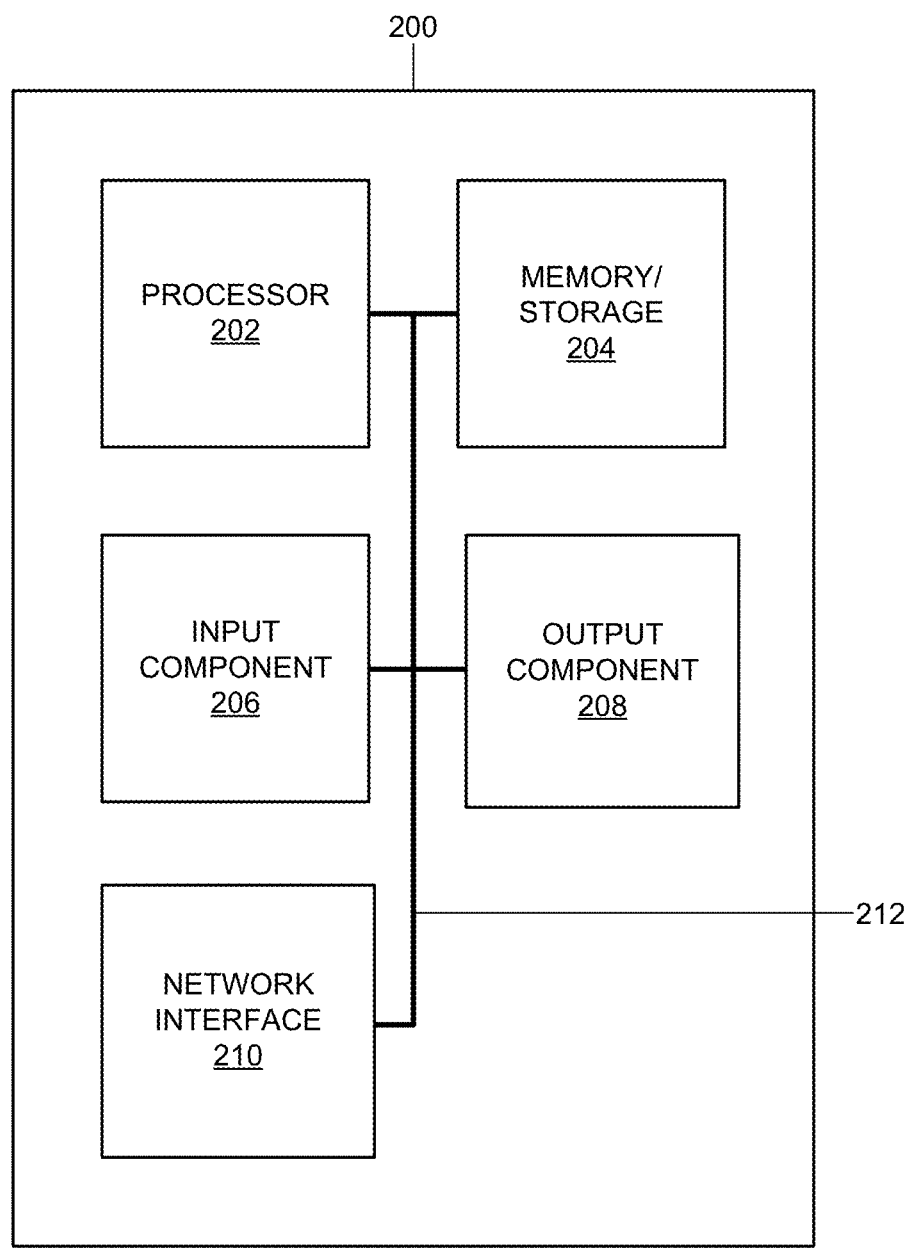
FIG. 2 depicts exemplary components of an exemplary network device of the environment of FIG. 1.

FIG. 2 depicts exemplary components of an exemplary network device 200. Network device 200 corresponds to or is included in UAV 102 and any of the network components of FIG. 1 (e.g., a control device 103, UAV flight management device 104, LAANC system 105, wireless stations 106, a router, a network switch, servers, gateways, etc.). Examples of devices that include network device 200 are: a smart phone; a tablet device; a wearable computer device (e.g., a smart watch); a global positioning system (GPS) device; a laptop computer; a desktop computer; a server; a media playing device; a portable gaming system; and an Internet-of-Thing (IoT) device. In some implementations, network device 200 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices.

As shown, network device 200 includes a processor 202, memory/storage 204, input component 206, output component 208, network interface 210, and communication path 212. In different implementations, network device 200 may include additional, fewer, different, or a different arrangement of components than the ones illustrated in FIG. 2. For example, network device 200 may include a display, network card, etc.

Processor 202 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 200 and/or executing programs/instructions.

Memory/storage 204 may include static memory, such as read only memory (ROM), and/or dynamic memory, such as random access memory (RAM), or onboard cache, for storing data and machine-readable instructions (e.g., programs, scripts, etc.).

Memory/storage 204 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 204 may be external to and/or removable from network device 200. Memory/storage 204 may include, for example, a Universal Serial Bus (USB) memory stick, a dongle, a hard disk, off-line storage, a Blu-Ray® disk (BD), etc. Memory/storage 204 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 206 and output component 208 may provide input and output from/to a user to/from device 200. Input and output components 206 and 208 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to device 200.

Network interface 210 may include a transceiver (e.g., a transmitter and a receiver) for network device 200 to communicate with other devices and/or systems. For example, via network interface 210, network device 200 may communicate with a ground control station, or with devices over a network.

Network interface 210 may include an Ethernet interface to a LAN, and/or an interface/connection for connecting device 200 to other devices (e.g., a Bluetooth interface). For example, network interface 210 may include a wireless modem for modulation and demodulation.

Communication path 212 may enable components of network device 200 to communicate with one another.

Network device 200 may perform the operations described herein in response to processor 202 executing software instructions stored in a non-transient computer-readable medium, such as memory/storage 204. The software instructions may be read into memory/storage 204 from another computer-readable medium or from another device via network interface 210. The software instructions stored in memory or storage (e.g., memory/storage 204, when executed by processor 202, may cause processor 202 to perform processes that are described herein. For example, management application 107 may be executed by processor 202 of UAV flight management device 104, to render map layers to illustrate various airspace features.

FIG. 3A through FIG. 11 include grayscale renderings of the corresponding, original color images. In the following, discussions regarding any one of the grayscale images or labeled portions of the grayscale images are to be regarded as discussions on the corresponding original color image or the corresponding portion of the original color images. For example, a discussion regarding grayscale item 302 in map 301 should be understood as a discussion pertaining to the corresponding item in the original, colored map.

Figure 3A:
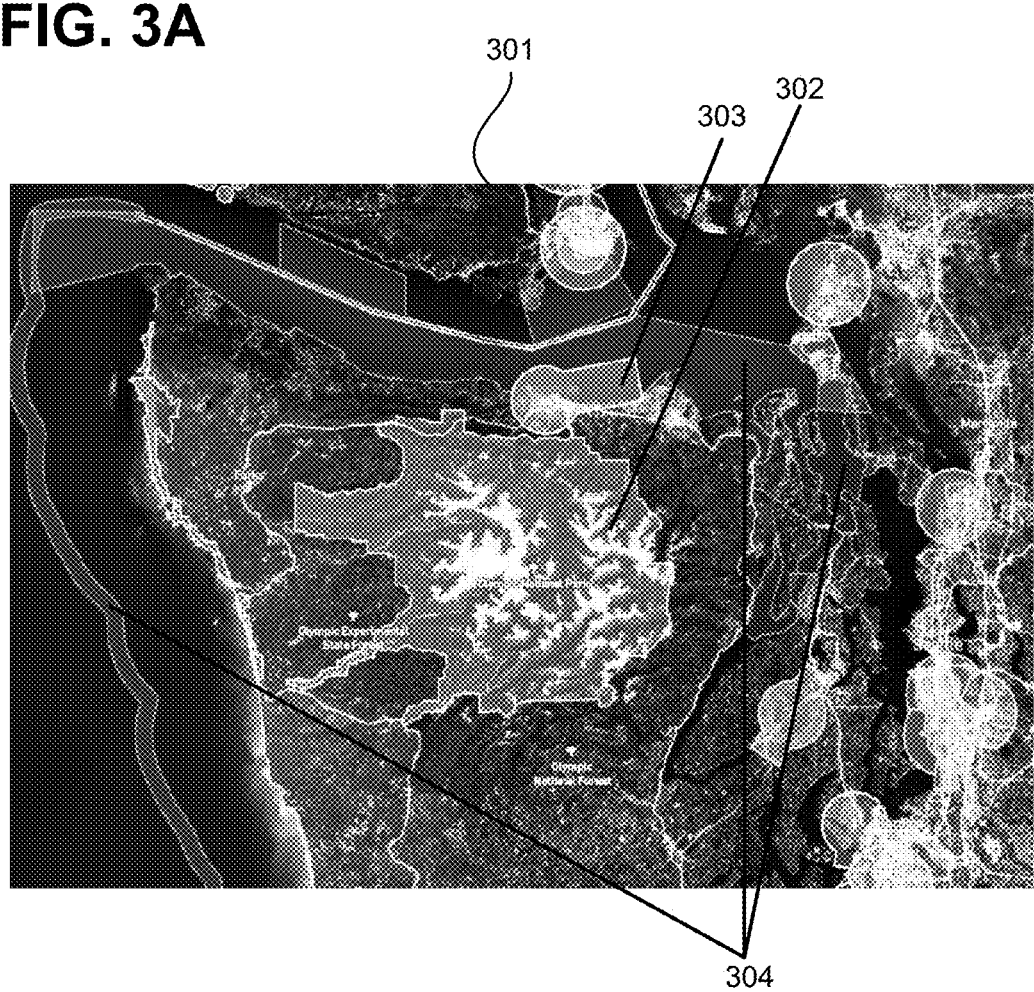
FIG. 3A is an exemplary map layer, which the management application of FIG. 1 may generate, that indicates different levels of airspace flight restrictions.

FIG. 3A is an exemplary map layer, which management application 107 of FIG. 1 may generate, that indicates different levels of airspace UAV flight restrictions. As discussed above, management application 107 may render map layers based on degrees of UAV airspace navigability. Since airspace restrictions directly affect whether UAV 102 can navigate an airspace, management application 107 assigns a visual style, such as a color and/or shading pattern, to a graphical element in a map layer based on flight restrictions.

In FIG. 3A, map 301, which is generated by management application 107, depicts a National Park airspace 302 and an airspace 303. In map 301, airspaces 302 and 303 share the same color (e.g., green) because UAV 102 is permitted to fly in both airspaces 302 and 303. Map 301 also shows airspaces 304. Regardless of whether each of airspaces 304 has LAANC access, UAVs 102 are highly unlikely to be permitted to fly in airspaces 304, and hence are depicted in the same color (e.g., red) in map 301 (or rather, in the corresponding original, color map).

Figure 3B:
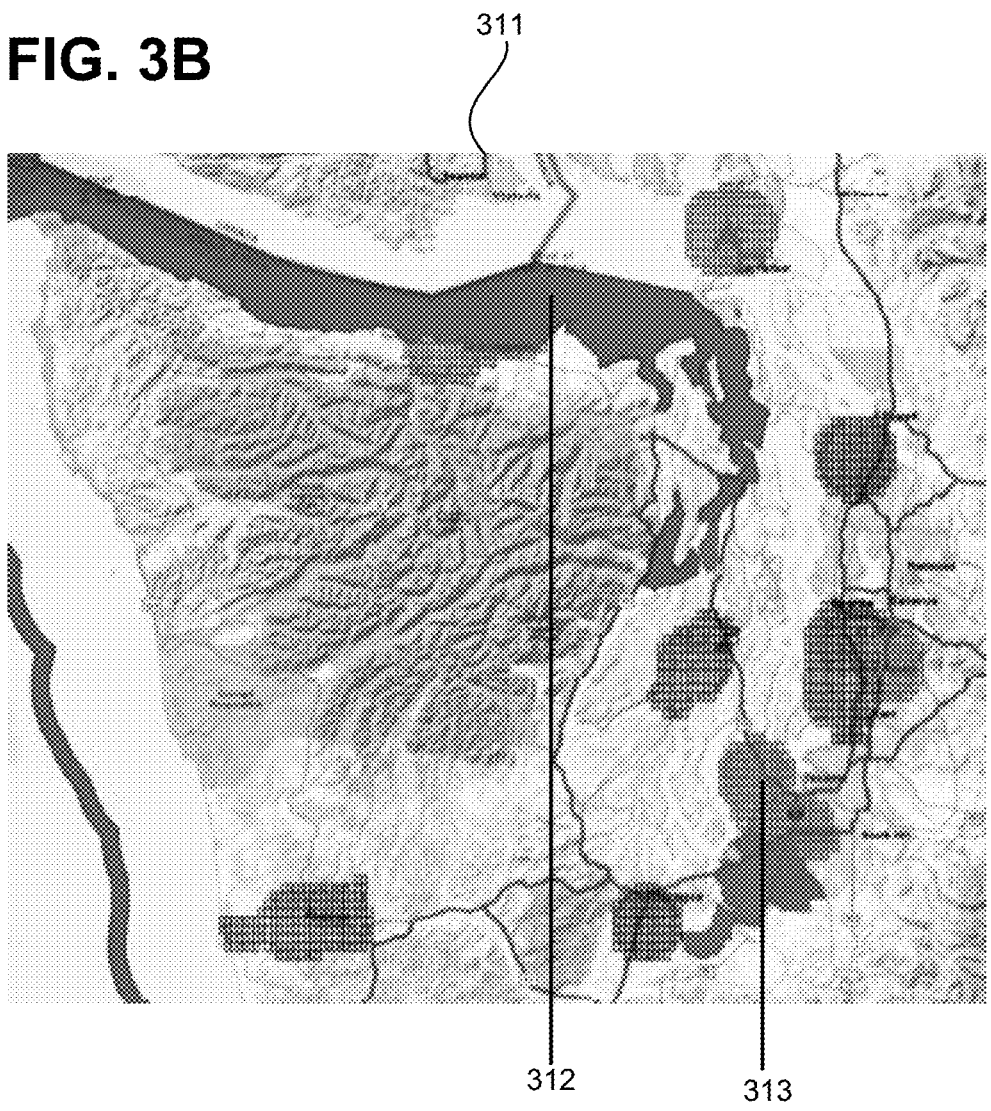
FIGS. 3B and 3C are exemplary map layers that do not use colors to directly indicate different levels of airspace flight restrictions.
Figure 3C:
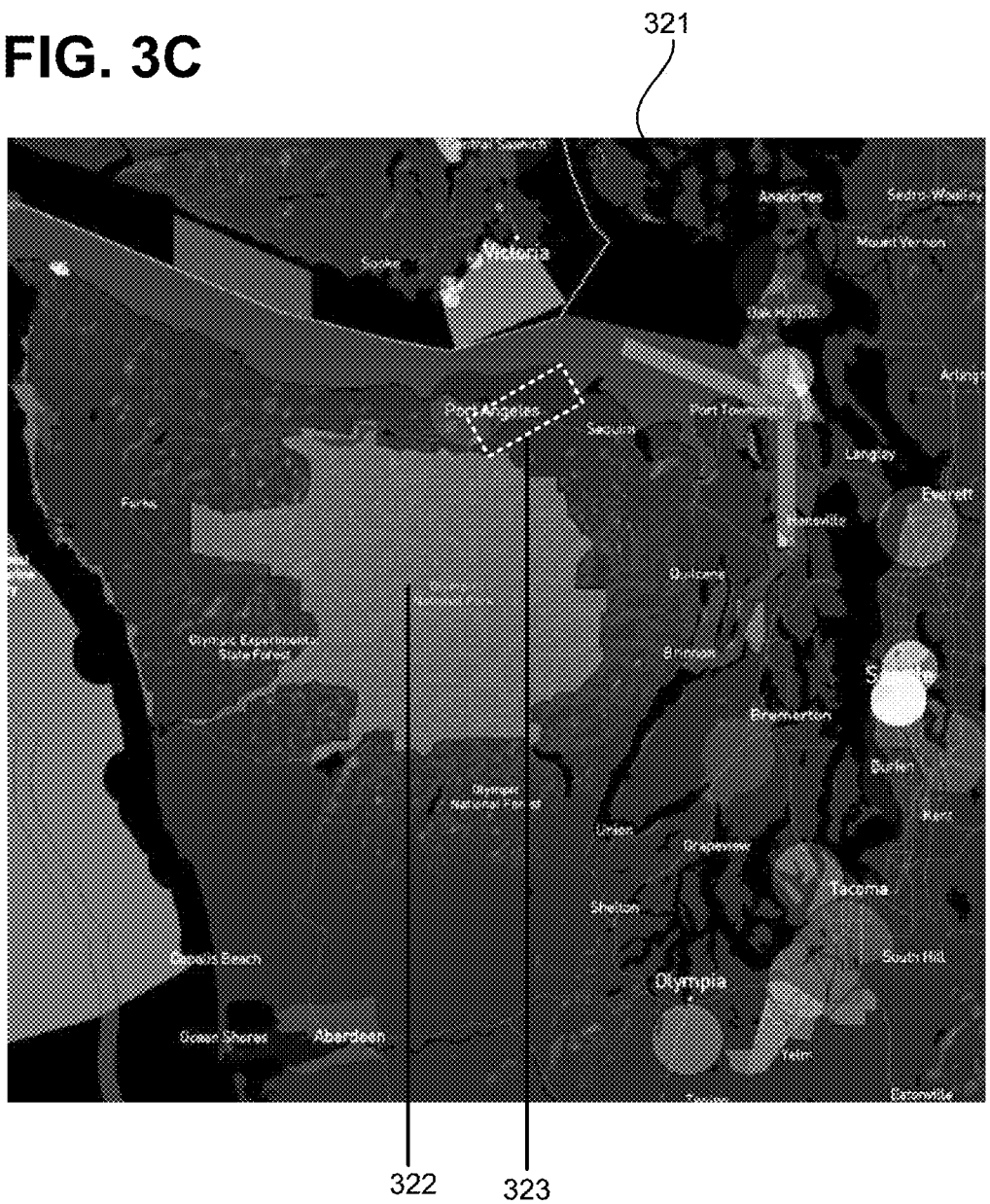

FIGS. 3B and 3C are exemplary map layers that do not use colors to directly indicate the degree of airspace restrictions and/or navigability, in contrast to FIG. 3A. In FIG. 3B, map 311 shows airspace 312 with Uncrewed Aircraft System (UAS) restrictions and airspace 313 that is without LAANC access. Airspaces 312 and 313, for example, may be displayed in different colors on map 311 (e.g., magenta and red), and it is not immediately apparent that both airspaces 312 and 313 are not navigable. In FIG. 3C, map 321 shows a National Park airspace 322 and airspace 323, which correspond to airspace 302 and airspace 303 in map 301. Airspaces 322 and 323 in map 321 are shown in different colors, although they both are navigable. Map 321 makes it difficult for the UAV operator to determine which airspaces are permissible to fly in and what level of restrictions to expect.

Figure 4A:
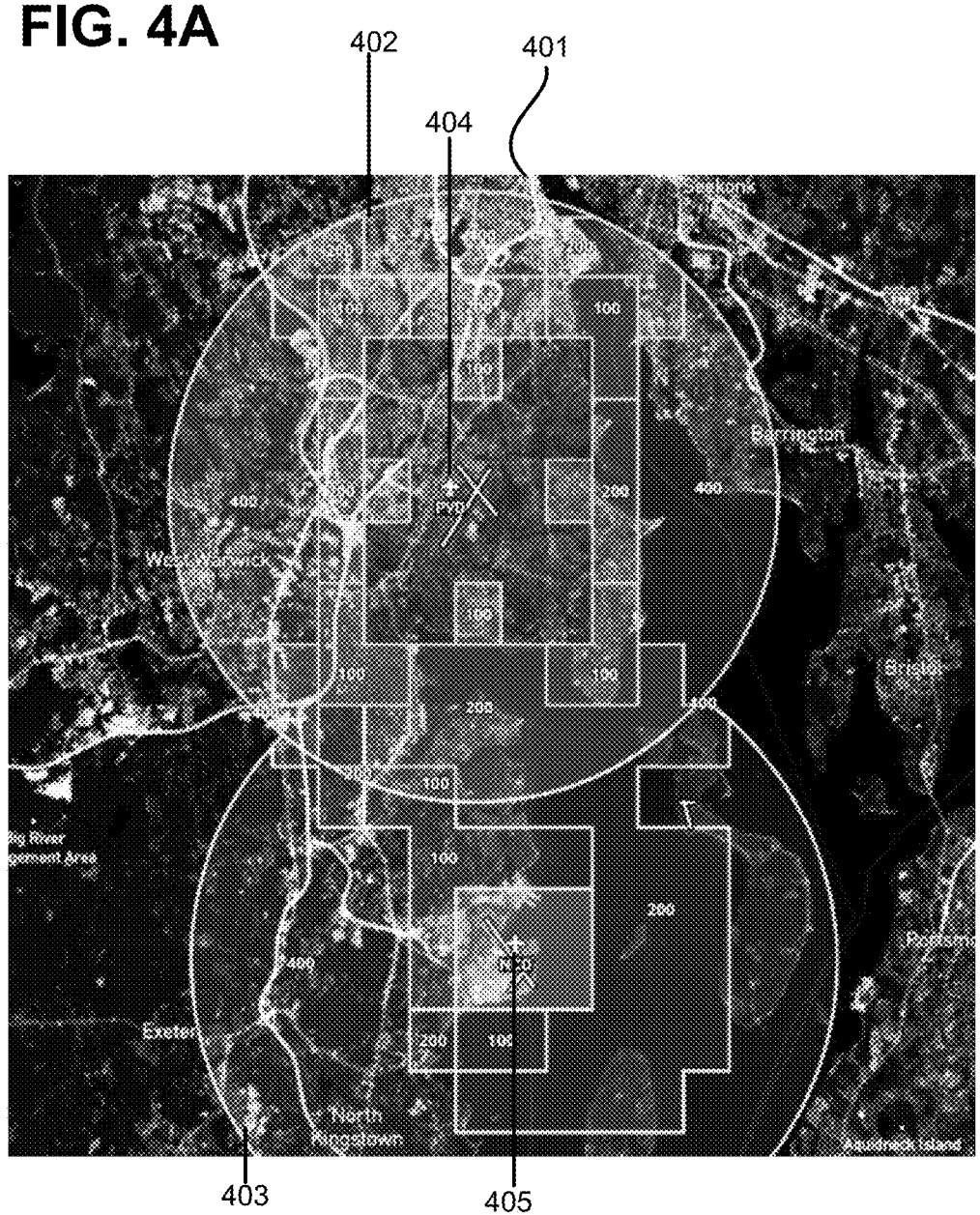
FIG. 4A is another exemplary map layer, which the management application of FIG. 1 may generate, that indicates different levels of airspace flight restrictions.

FIG. 4A is another exemplary map layer, which management application 107 of FIG. 1 may generate, that indicates different levels of airspace flight restrictions. The airspaces in map 401 belong to different classes (e.g., Classes B, C, D, or E). However, map 401 does not focus on visually distinguishing different classes of airspaces, since, for each airspace, as its class is not the primary factor in the UAV operator planning the flight. Thus, in FIG. 4A, the class of airspace does not affect the rendering. Instead, management application 107 allows the class of controlled airspace to be discoverable in pop-ups that include more information about the airspace features (not shown). For example, an operator may trigger a window to popup over an map area over specified by a screen cursor (e.g., by a mouse click). The popup window may display airspace information, such as its Class A, Class B, altitudes, etc.

When generating map 401, management application 107 uses one color (e.g., blue) to indicate that the UAV operator can fly in and another color (e.g., orange) to indicate that LAANC is not available in the area with the other color. More specifically, the orange indicates that it may be possible to fly in the airspace, but permission has to be obtained outside of management application 107. Exemplary blue and orange airspaces in map 401 are shown in FIG. 4A as circular airspaces 402 and 403, respectively.

Figure 4B:
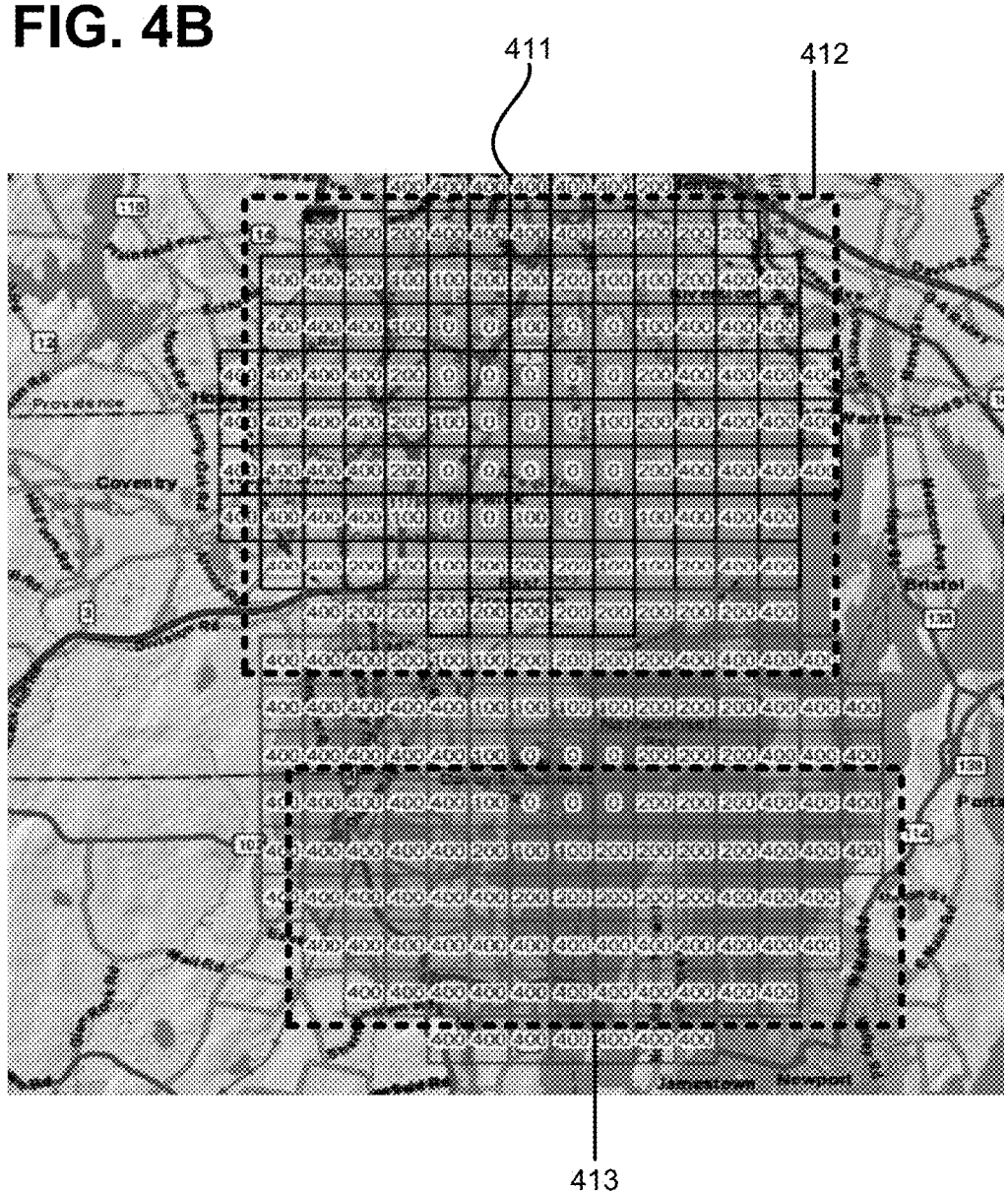
FIGS. 4B-4E are exemplary map layers that do not focus on different levels of airspace flight restrictions as the primary criterion for applying uniform visual styles to different elements in the layers, according to different implementations.
Figure 4C:
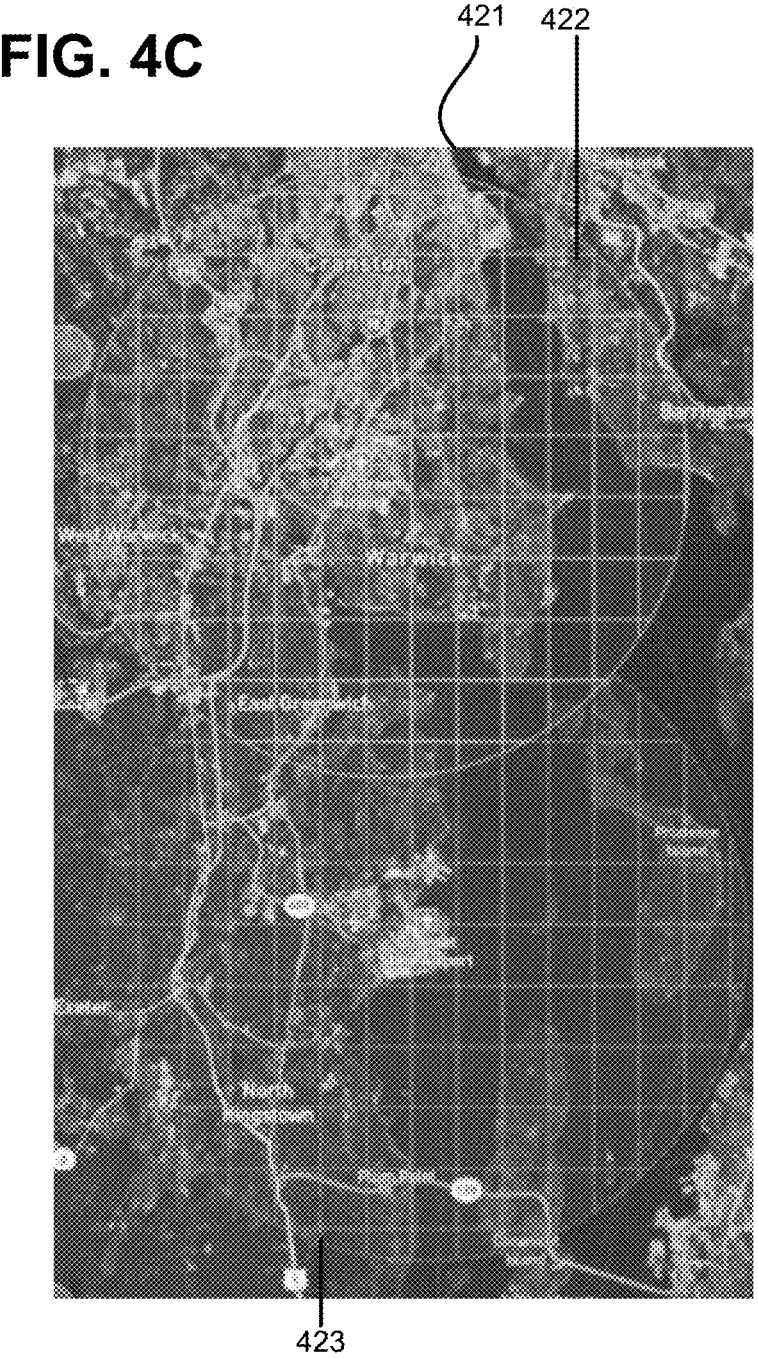
Figure 4D:

In addition, as shown in map 401, management application 107 combines or merges all the adjacent grid areas that share the same restrictions or flight rule set (see FIGS. 4B-4D). Eliminating gridlines in airspaces 402 and 403, for example, decreases the number of distractions for UAV operators who do not care if they cross arbitrary gridlines during their operations. That is, the UAV operators care only when the rules change where their UAVs fly. Restrictions common to adjacent grid elements may be reflected on the map layer associated with the polygon associated with the adjacent grid elements. For example, polygon 407 shows adjacent grid elements that share a common altitude limit (ceiling) of 100 feet AGL with a single icon and color/shading pattern. [Need to add this callout to FIG. 4A]

In addition, map 401 aids UAV operators to grasp not only the restrictions and rules for each airspace, but the reasons why the restrictions and rules may be in place—which is easier for the UAV operators to comprehend than just looking at the restrictions. For example, in map 401, with the airports 404 and 405 visible in the center of airspaces 402 and 403, the UAV operator can perceive why the specific airspaces (having certain altitudes) were selected for UAVs. Where there is more concern with crewed air traffic, there are more restrictions.

Map 401 shows airspaces 402 and 403 with different shadings or opacities which correspond with their altitudes. Increasing the shading/opacity enforces the feeling of restrictions being greater for certain airspace areas, such as an airspace closer to airport 404, airport 405, or another area of concern, and increasing transparency reflects lesser restrictions in an airspace further from airport 404, airport 405, or the other area of concern. Management application 107 thus seeks to permit UAV operators, who may have just a basic level of understanding and familiarity with maps generated by management application 107, to quickly comprehend not only the restrictions of the airspace, but also the reasons why the restrictions are in place.

FIGS. 4B-4E illustrate exemplary map layers that fail to clearly convey information useful to a UAV operator in determining whether to fly in an airspace. In contrast to FIG. 4A, FIGS. 4B-4E do not use different levels of airspace flight restrictions or their navigability as the primary criterion for applying uniform visual styles to different map elements in the layers. Although not immediately apparent from FIGS. 4B-4E, the maps in FIGS. 4B-4E make a visual distinction between the B, C, D, and E classes of airspace. This is usually accomplished using a combination of a color scheme and line styles (e.g., dashed vs. solid lines).

In FIG. 4B, map 411 uses red in area 412 to indicate that a LAANC authorization is not available and green to indicate the opposite. Map 411 also includes the ceiling altitude AGL (e.g., 100 feet, 200 feet, 400 feet, etc.) in each grid area. Map 411 can be visually overwhelming for UAV operators, especially if they have flights that cross into several of the grids, and therefore the view presented by FIG. 4A may provide a more useful depiction of the airspace. The layer shown in FIG. 4B may be applied to the map to illustrate the underlying LAANC grid restrictions when such detail is desired.

In FIG. 4C, map layer 421 uses a color scheme and line style to show different classes of airspace (e.g., red circular area 422 and blue circular area 423). The LAANC grid is visible in areas 422 and 423, but no indication is given at this zoom level of the status of LAANC availability in areas 422 and 423. Map 421 also does not give the UAV operator the ability to predict how altitude limits AGL are likely to appear across airspaces.

Figure 4E:
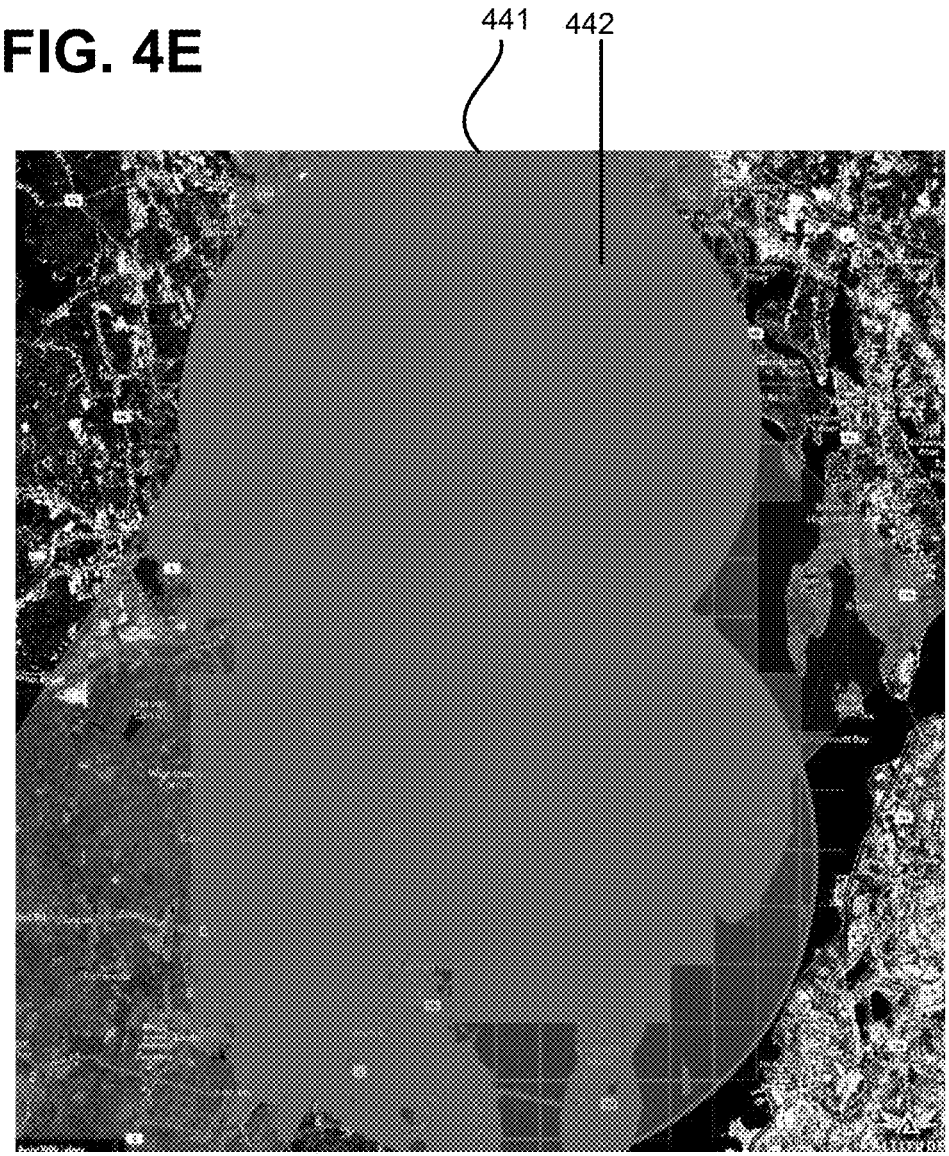

In FIG. 4D, map layer 431 includes gridlines. Gray gridlines indicate that LAANC system 105 is not available to provide authorizations. Map 431 uses a spectrum of colors to indicate the altitude limits of each grid block. The lower end is illustrated in red and the upper end is illustrated in green. Thus, the grids may give a wrong impression to UAV operators, that they cannot fly UAVs in the red areas and that they are free to fly UAVs in the green areas. In actuality, a UAV operator can fly the UAVs in any of the areas if proper steps are taken. In FIG. 4E, map 441 shows a significant amount of pink in area 442 and individual grids that fail to convey LAANC availability or navigability.

Figure 5:
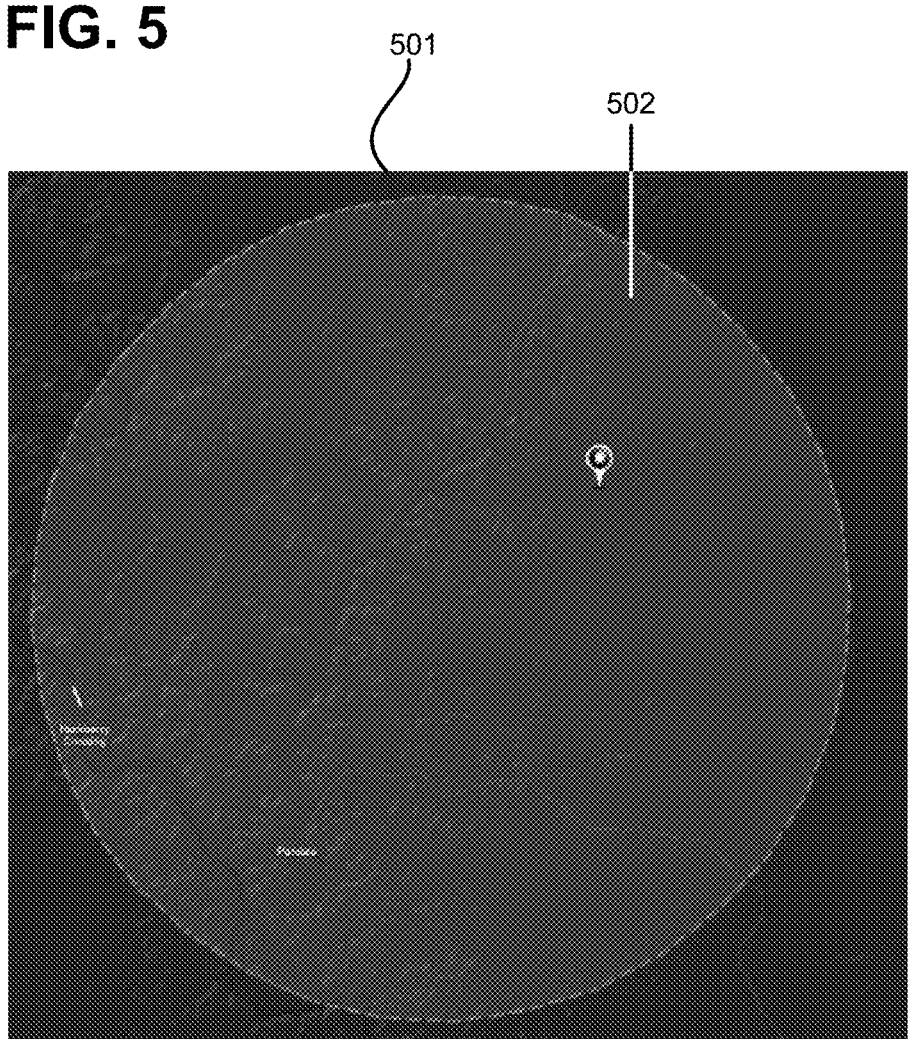
FIG. 5 shows an exemplary map layer, generated by the management application using dashed lines to indicate temporary airspace restrictions over certain areas, according to one implementation.

FIG. 5 shows an exemplary map layer generated by management application 107 using dashed lines to indicate that airspace restrictions over certain areas (circular area 502) are temporary, according to one implementation. For those planning UAV operations, it is important to know if the restriction they see is permanent or temporary. For example, map 501 includes circular area 502 over which Temporary Flight Restrictions (TFRs) apply, circumscribed by a dashed circle. The UAV operator may obtain additional information regarding the TRF by hovering a screen cursor in the map area of interest and activating a popup window. The window may then display additional information, such as the duration of the restriction, altitudes to which the restriction applies, etc.

Figure 6:
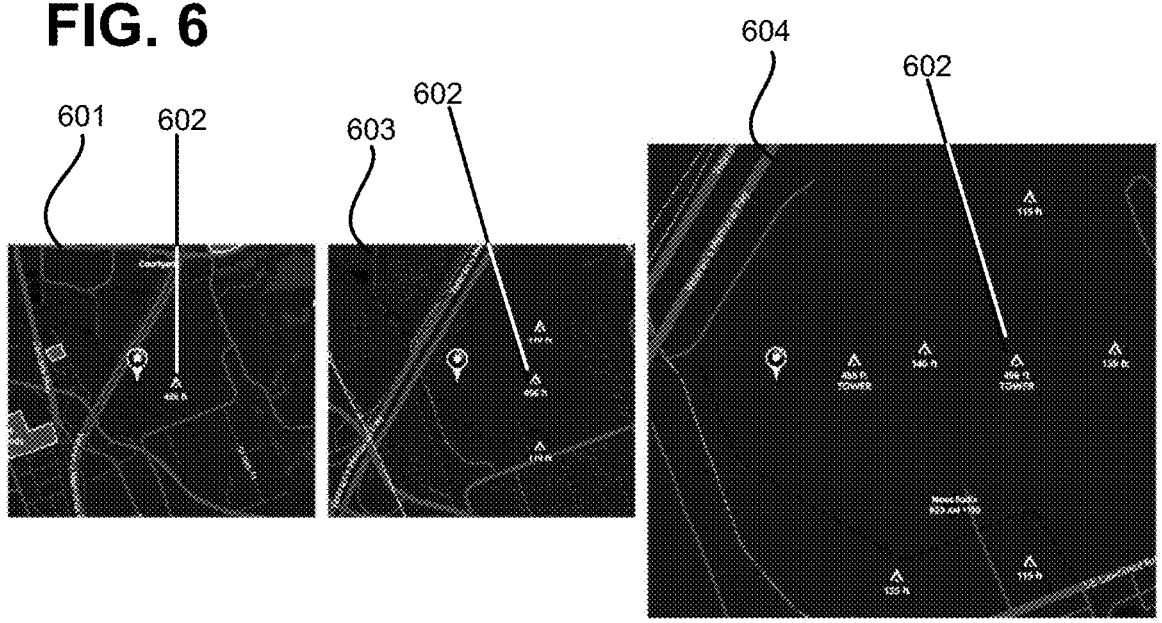
FIG. 6 shows an exemplary map layer, generated by the management application, which illustrates airspace obstacles, according to one implementation.

FIG. 6 shows exemplary map layers, generated by management application 107, which illustrate airspace obstacles 602, according to one implementation. The FAA's sectional charts call out obstacles 602 that may pose a hazard to crewed aircraft. The indicated obstacles 602 may include radio towers, windmills, or other objects that rise steeply above their surroundings, thus justifying why they should be called out on the charts. For UAV operators, it is vital to know the locations of the obstacles, especially those clustered in close proximity to one another. However, whereas the crewed aircraft only needs to avoid the tallest obstacle in an area, a UAV operating at lower altitudes and variable flight routes is likely to need to avoid all of the obstacles.

When a UAV operator plans a mission in an area, knowing the height of the tallest obstacle permits the operator to set the flight altitude minimums to help create a safer flight. A satellite image layer alone cannot be effectively relied upon to convey the obstacle-related information to the UAV operator. To address such issues, as depicted in FIG. 6, management application 107 displays such features as heights of the tallest obstacles in flight areas.

When management application 107 generates a map layer, management application 107 accesses either a local database or a database in network 101 to show a zoom-dependent view of the obstacles. For example, at a far-away zoom level, management application 107 may not show obstacles, because at the zoom level, the UAV operators would be looking at a wide area and not be concerned with the ground.

When the UAV operator zooms to a particular level (e.g. a lower zoom level, showing a wider area), management application 107 may show an icon that represents the tallest object in the area, along with its height. If there are multiple obstacles in the area, management application 107 shows only the tallest one, as it is expected that the UAV operator would not need additional obstacle-related information at the particular zoom level. In FIG. 6, map layer 601 (associated with a far-away zoom level) shows obstacle 602 and its height.

When the UAV operator zooms in closer, management application 107 may show additional obstacles, which may be clustered close to one another. Map layer 603 (associated with such a zoom level) shows obstacles in addition to obstacle 602. When the zoom level is above a threshold, management application 107 may display most or all of the obstacles, along with their descriptions if available ("TOWER" or "CRANE" for example), as shown by map layer 604.

Figure 7:
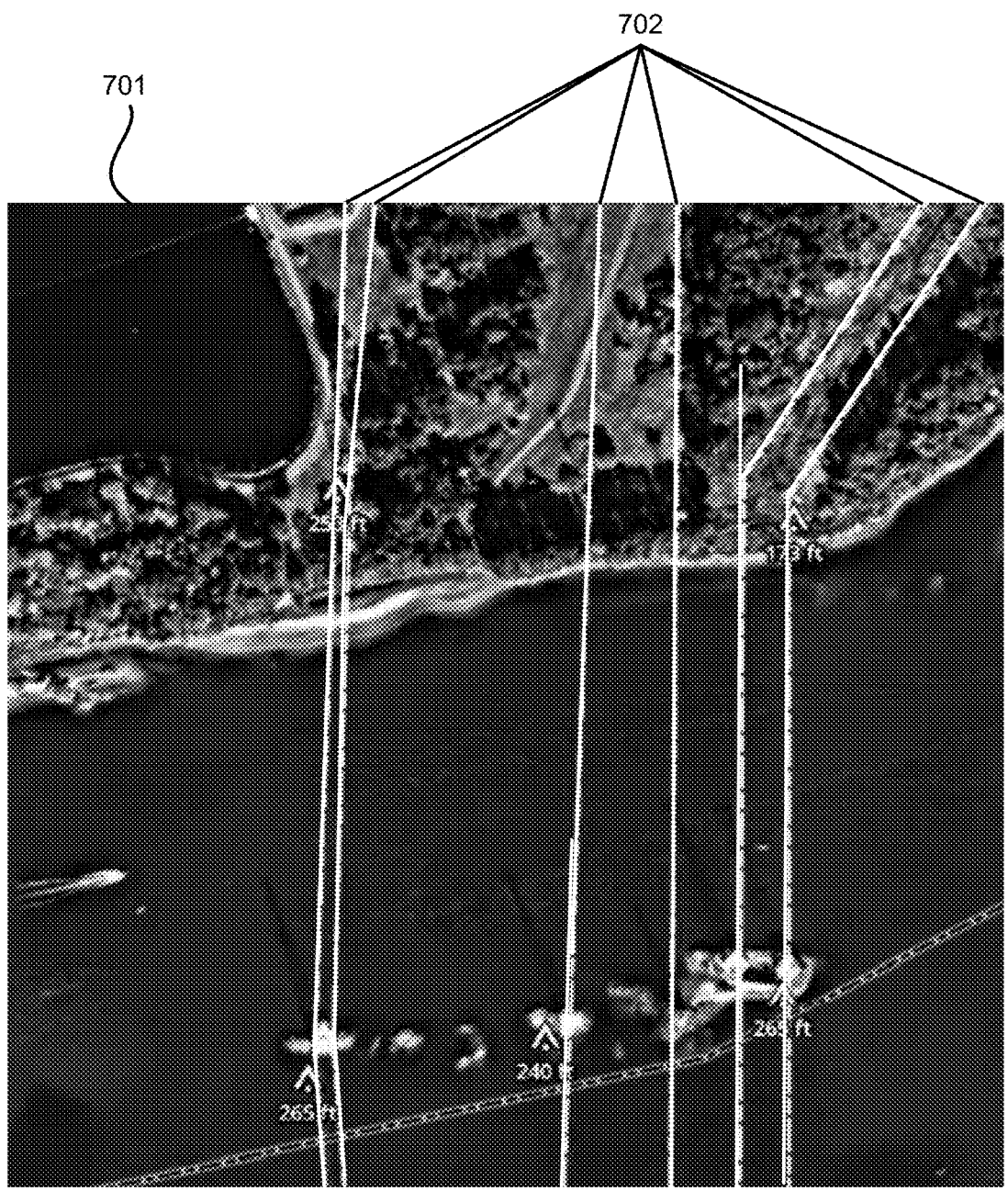
FIG. 7 shows an exemplary map layer, generated by the management application, in which solid colored lines represent powerlines, according to one implementation.

FIG. 7 shows an exemplary map layer, generated by the management application 107 in which solid colored lines (e.g., yellow) represent powerlines, according to one implementation. The map contrasts with FAA sectional charts (not shown). Although FAA sectional charts call out powerlines and pylons when the space allows for them, these call outs are, however, primarily for navigation and wayfinding purposes for the in-vehicle pilot.

In contrast, for a UAV operator, knowing the locations of powerlines is important, because powerlines can cause Radio Frequency (RF) or other signal interference for communications with the UAV. In addition, powerlines pose a collision risk, especially if the flights extend beyond visual line of sight. In FIG. 7, map 701 shows powerlines 702, at the appropriate zoom level. In one implementation, powerlines 702 are shown in yellow, to indicate that the object is something that the UAV operator needs to be aware of.

Figure 8:
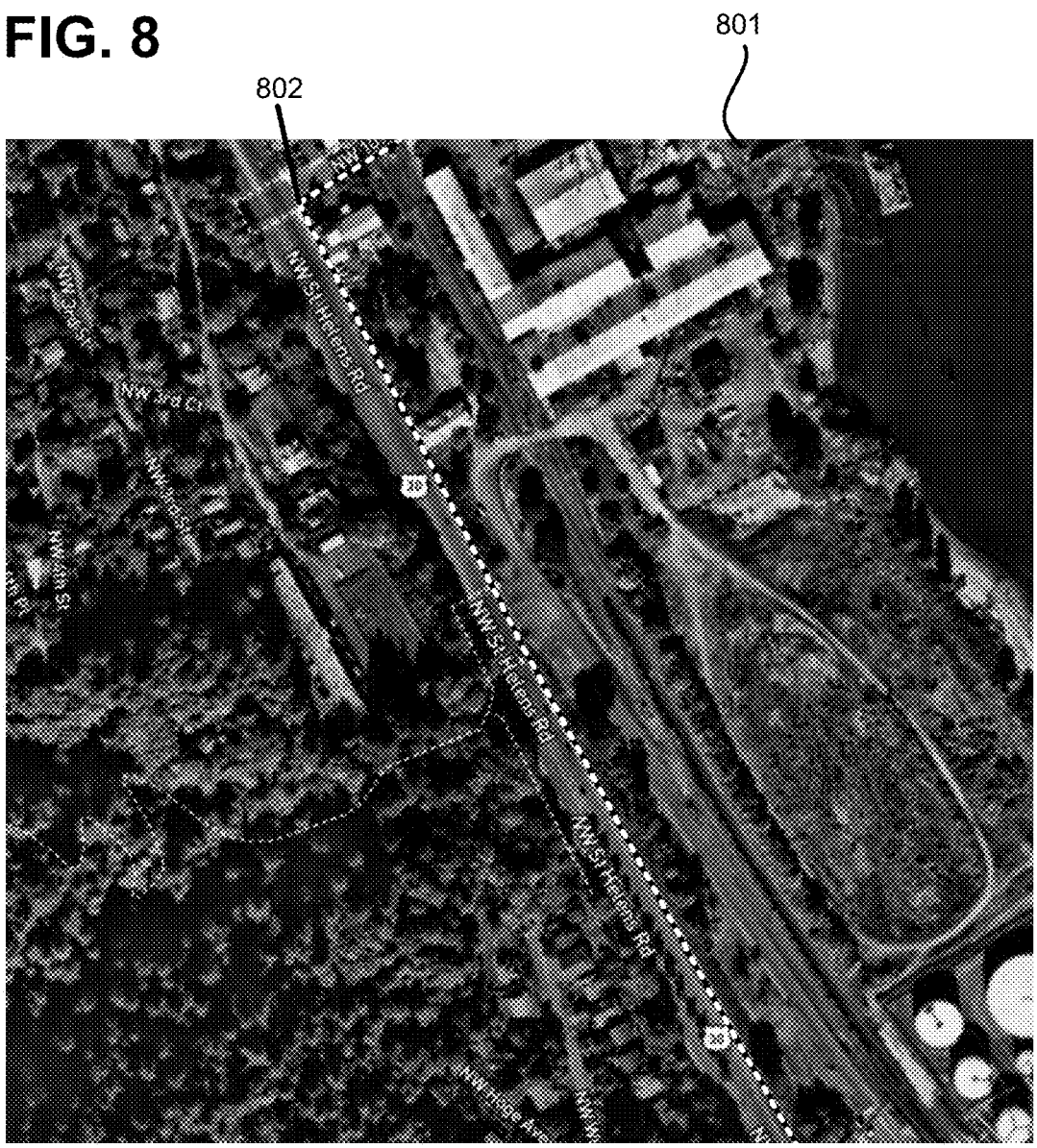
FIG. 8 shows an exemplary map layer, generated by the management application, in which colored dashed lines represent pedestrian paths, according to one implementation.

FIG. 8 shows an exemplary map layer, generated by management application 407, in which colored (e.g., yellow) dashed lines represent pedestrian paths, according to one implementation. Typical pedestrian paths include areas where people are likely to be present without using a vehicle. Knowing the locations of pedestrian paths are important to UAV operators, because UAVs are not allowed to hover or fly over people without a waiver. In one implementation, management application 107 highlights pedestrian paths in a map layer, at appropriate zoom levels, using dashed yellow lines distinct from those representing powerlines. Pedestrian path information that a map layer displays can be important to the UAV operator, especially when the pedestrian paths are not visible (e.g., from a satellite image or from sight) and the UAV operator can accidentally fly the UAV over them without realizing the potential danger and laws. Map 801 shows an exemplary pedestrian path 802 close to an industrial area, which may not be expected by the UAV operator.

Figure 9:
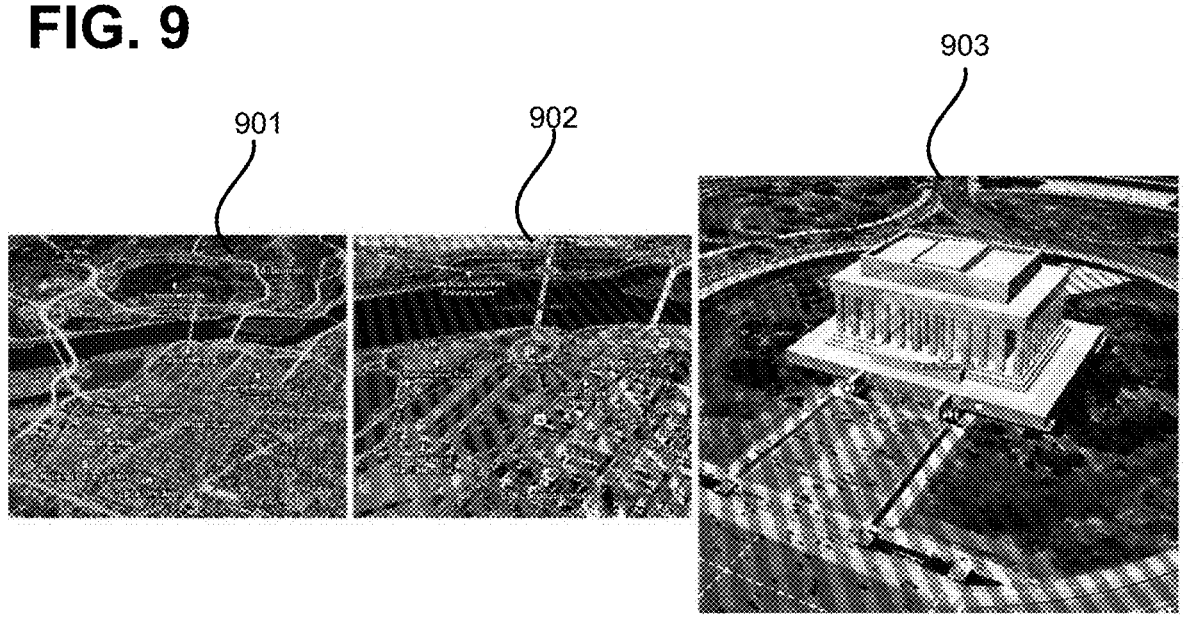
FIG. 9 shows an exemplary map layer, generated by the management application, in which fill patterns are used to indicate navigation restrictions at different zoom levels, according to one implementation.

FIG. 9 shows exemplary map layers 901-903, generated by the management application 107, in which fill patterns are used to indicate navigation restrictions at different zoom-levels, according to one implementation. One of the reasons a UAV operator may use management application 107 is to gain situational awareness of an area they might want to navigate UAVs in. To further foster UAV operator awareness, management application 107 provides satellite map images, without overlaying too many other map layers. When there are too many layers, it becomes difficult for UAV operators to see the base layer without having to manually turn off various other layers of the map.

To avoid map layers blocking the desired view, management application 107 uses a system of variable fills and patterns based on zoom levels. When a UAV operator is zoomed far out as shown by map layer 901, the fill pattern for a restricted airspace is a solid fill. When zoomed in close, as shown by map layers 902 and 903, management application 107 applies a striped pattern, for example. In this manner, management application 107 allows the UAV operator to keep the map layer which indicates that the airspace is restricted, but without being overwhelmed by the color.

When the UAV operator zooms in, the boundaries of the airspace can become lost, and it can be difficult for the UAV operator to determine whether the base layer includes the color indicating that the airspace of interest is within a restricted area. The striped fill pattern (e.g., red fill pattern in layer 903) can still provide appropriate signal, even when zoomed in closely, to warn UAV operators of the restrictions.

In FIG. 9, map layers 901, 902, and 903 are associated with three different zoom levels: far-away, intermediate, and close. Map layers 901, 902, and 903 show increasing intensities of a color in diagonal strips. At the far-away zoom, the color of the strips in image 901 is much darker than in image 903, in the close zoom, to avoid blocking the view of desired map features.

Figure 10:
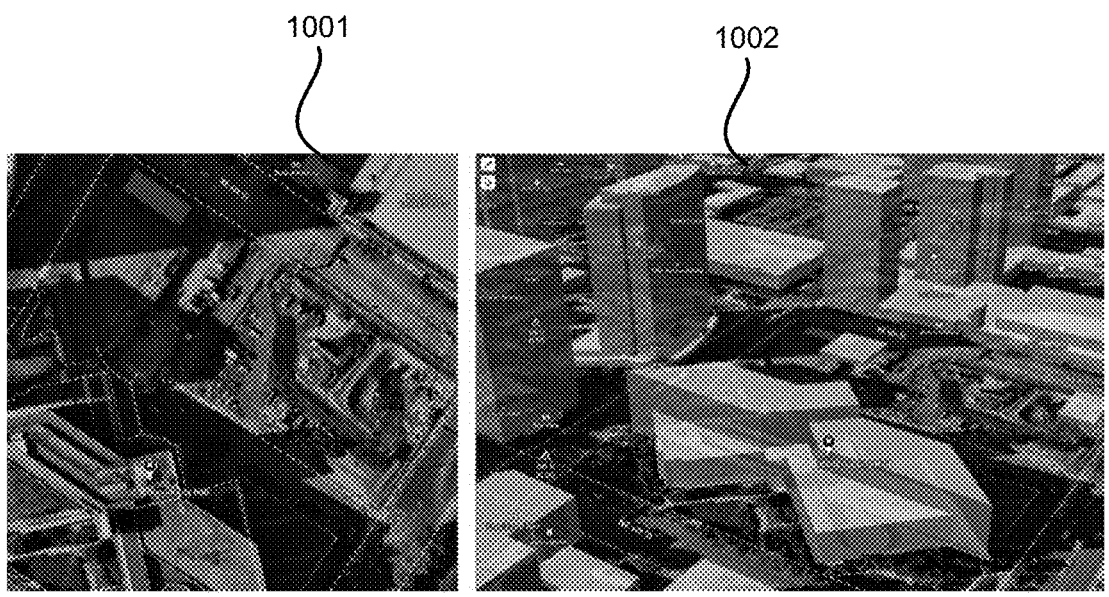
FIG. 10 shows an exemplary map layer, generated by the management application, that includes three-dimensional (3D) renderings to provide a UAV operator with the awareness of structures in an airspace, according to one implementation.

FIG. 10 shows an exemplary map layer, generated by management application 107, which includes three-dimensional (3D) renderings to provide the UAV operator with the awareness of structures, according to one implementation. As shown, management application 107 may displays a satellite image 1001 in one viewing mode and displays a 3D image 1002 of structures when the user initiates a 3D mode.

When looking at a satellite image 1001 of a rooftop or the 3D image 1002, the UAV operator may want to see the details of the roof as opposed to it being obstructed by other features, and therefore allows 3D mode to be turned on or off. This allows the UAV operator to evaluate the airspace with less distraction.

Figure 11:
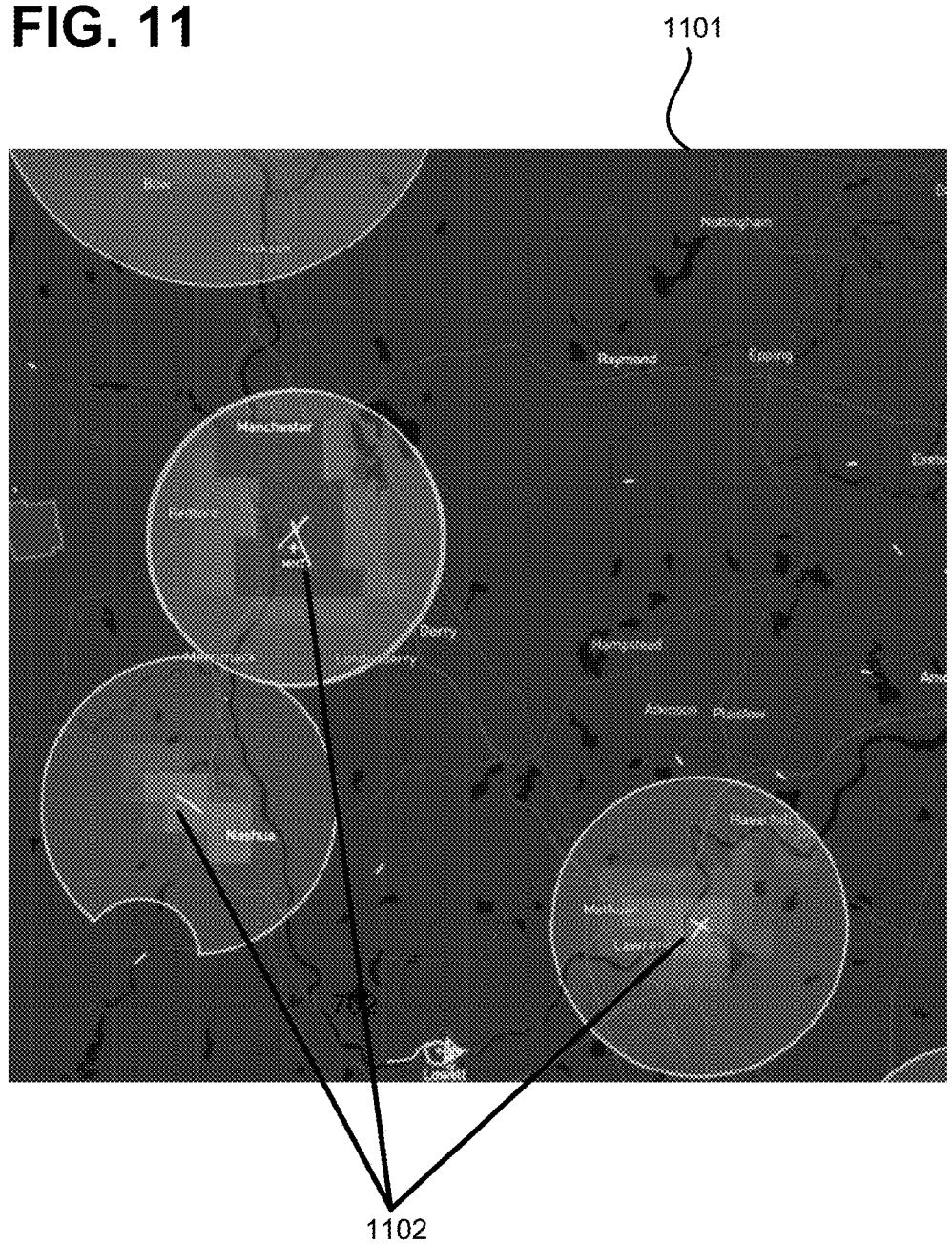
FIG. 11 shows an exemplary map layer, generated by the management application, that includes airport runway markings, according to one implementation.

FIG. 11 shows an exemplary map layer, generated by management application 107, which includes airport runway marking, according to one implementation. In its renderings, management application 107 highlights airport runways, even at far-away zoom levels. For example, in layer 1101, the runways 1102 (illustrated as lines) are highlighted. The highlights not only shows the UAV operator the locations of the airports, but also gives indications of the airport sizes, their orientations, and likely traffic patterns around the airports. For example, a group of long lines indicates that the airport has multiple runways and that air traffic patterns may have several different approach paths. A single, short runway indicates that the airport is a small one. The direction of the runway can also help the UAV operator in understanding what to expect in the area.

Figure 12:
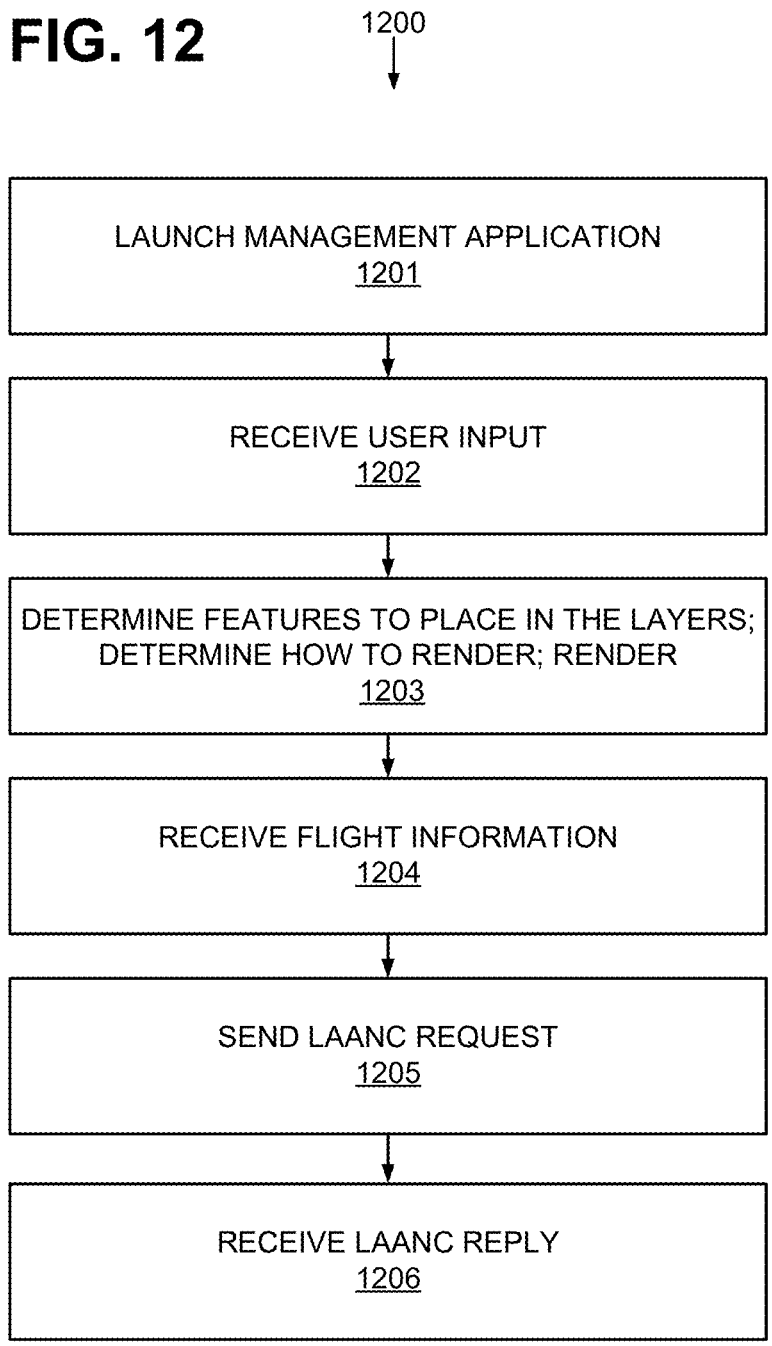
FIG. 12 is a flow diagram of an exemplary process for rendering layers of an airspace map for UAV flight planning, according to one implementation.

FIG. 12 is a flow diagram of an exemplary process 1200 for providing map layers according to one implementation. Process 1200 may be performed by programs on UAV flight management device 104 and/or programs on control device 103, although in the following, process 1200 is described as being performed by management application 107. As shown, process 1200 may include launching management application 107 on UAV flight management device 104 (block 1201).

Management application 107 may receive user input (block 1202). For example, management application 107 may receive user input for planning a UAV flight, such as coordinates or address of a physical location at which the UAV is to begin its flight, the time of the flight, a zoom level, etc.

Process 1200 may further include determining what features to place in the layers (block 1203), depending on the airspaces of the areas to be rendered in the map and the zoom level. For example, management application 107 may determine that the area to be rendered includes two airports, one powerline, and an obstruction at a particular zoom level. Furthermore, management application 107 may determine how to render each of the features (block 1203). For example, management application 107 may decide to render an area near an airport, determine fill patterns, determine what obstacles need to be rendered, etc. In another example, management application 107 may determine that a pedestrian walkway and a powerline need to be rendered in a particular color. Furthermore, after determining what features to render and how to render the particular features, management application 107 may render the map (block 1203). The rendered map layers may show, in addition to the potential flight area, various features for airspaces, such as altitudes, LAANC gridlines, and/or other features discussed above with reference to FIGS. 3A-11.

Process 1200 may further include receiving flight information from the user (block 1204). For example, when the user is presented with the rendered map layers, the user may use a mouse or a touchscreen to input the desired flight path. The flight information input by the user may include, in addition to the flight path information, for example, indications as to whether the user wishes to obtain a LAANC authorization for the selected flight at a scheduled time, whether the flight information should be stored as a planned flight, etc.

Process 1200 may include sending a request for a grant of the authorization to make the planned flight to LAANC system 105 over network 101 (block 1205). Management application 107 may receive a reply from LAANC system 105 (block 1206). The reply may indicate whether the request is granted, denied, or conditionally granted (e.g., approved pending additional approval from another agency).

If the request was granted, the user (e.g., a UAV operator) may fly the UAV 102 in the authorized area at the scheduled time, using control device 103. In some implementations, management application 107 may update the map to indicate the authorization statuses of the flight path (e.g., granted, denied, or conditionally granted).

In this specification, various preferred embodiments have been described with reference to the accompanying drawings. It will be evident that modifications may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIG. 12, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein. For example, in some implementations, when the management application generates map layers, the map application may use line weights, line styles, and fill patterns to provide additional information for the map features without color, for colorblind users or UAV operators.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A device comprising:
  a processor configured to execute instructions to:
    receive first operator input;
    generate layers for a map based on the first operator input, wherein the layers include features relevant to operation of an Uncrewed Aerial Vehicle (UAV) in an airspace corresponding to an area within the map;
receive second operator input that specifies a path on the map, for a UAV flight;
send a request for authorization for the UAV flight to a Low Altitude Authorization and Notification Capability (LAANC) system over a network; and
receive a reply, from the LAANC system over the network, that grants authorization for the UAV flight, wherein when generating the layers, the processor is further configured to:
render one of the layers, wherein the one of the layers illustrates airspaces with similar flight restrictions using a same color; and
render an area layer, included in the layers, wherein the area layer shows areas in which adjacent grid areas, defined by the LAAANC system, have been merged, and wherein the merged areas have a same color.

2. The device of claim 1, wherein when the processor generates the layers, the processor is further configured to:
render another one of the layers, wherein the other one of the layers illustrates a potential source of radio frequency interference for a UAV in an area shown by the map.

3. The device of claim 1, wherein the processor is further configured to:
render another one of the layers, wherein the other one of the layers indicates locations where people may be present.

4. The device of claim 1, wherein when the processor generates the layers, the processor is further configured to:
render another one of the layers, wherein the other one of the layers illustrates airport runways.

5. The device of claim 1, wherein when the processor generates the layers, the processor is further configured to:
render another one of the layers, wherein the other one of the layers illustrates no obstacles at a far-away zoom, a tallest obstacle at an intermediate zoom, and all obstacles at a close zoom.

6. The device of claim 1, wherein when the processor generates the layers, the processor is further configured to:
render another one of the layers, wherein the other one of the layers indicates airspaces with Temporary Flight Restrictions (TFR) using line styles.

7. The device of claim 1, wherein when the processor generates the layers, the processor is further configured to:
render another one of the layers, wherein the other one of the layers indicates flight restrictions for an airspace with a variable fill pattern having color opacity that depends on a zoom level associated with the other one of the layers.

8. The device of claim 1, wherein when the processor generates the layers, the processor is further configured to:
render another one of the layers, wherein the other one of the layers provides a three-dimensional (3D) view of areas covered by the map.

9. The device of claim 1, wherein the processor is further configured to:
collect one or more data sets, wherein the data sets include at least one of: class airspace information, airspace schedule information, or map information.

10. The device of claim 9, wherein the processor is further configured to:
convert metadata for the one or more data sets into a human readable form.

11. A method comprising:
receiving first operator input;
generating layers for a map based on the first operator input, wherein the layers include features relevant to operation of an Uncrewed Aerial Vehicle (UAV) in an airspace corresponding to an area within the map;
receiving second operator input that specifies a path on the map, for an Uncrewed Aerial Vehicle (UAV) flight,
sending a request for authorization for the UAV flight to a Low Altitude Authorization and Notification Capability (LAANC) system over a network; and
receiving a reply, from the LAANC system over the network, that grants authorization for the UAV flight, wherein generating the layers includes:
rendering one of the layers, wherein the one of the layers illustrates airspaces with similar flight restrictions using a same color; and
rendering an area layer, included in the layers, wherein the area layer shows areas in which adjacent grid areas, defined by the LAAANC system, have been merged, and wherein the merged areas have a same color.

12. The method of claim 11, wherein generating the layers further includes:
rendering another one of the layers, wherein the other one of the layers illustrates a potential source of radio frequency interference for a UAV in an area shown by the map.

13. The method of claim 11, wherein generating the layers further includes:
rendering another one of the layers, wherein the other one of the layers indicates locations where people may be present.

14. The method of claim 11, wherein generating the layers further includes:
rendering another one of the layers, wherein the other one of the layers illustrates airport runways.

15. The method of claim 11, wherein generating the layers further includes:
rendering another one of the layers, wherein the other one of the layers illustrates no obstacles at a far-away zoom, a tallest obstacle at an intermediate zoom, and all obstacles at a close zoom.

16. The method of claim 11, wherein generating the layers further includes:
rendering another one of the layers, wherein the other one of the layers indicates flight restrictions for an airspace with a variable fill pattern having color opacity that depends on a zoom level associated with the other one of the layers.

17. The method of claim 11, wherein generating the layers further includes:
rendering another one of the layers, wherein the other one of the layers indicates airspaces with Temporary Flight Restrictions (TFR) using line styles.

18. The method of claim 11, wherein generating the layers further includes:
rendering another one of the layers, wherein the other one of the layers provides a three-dimensional (3D) view of areas covered by the map.

19. The method of claim 11, further comprising:
collecting one or more data sets, wherein the data sets include at least one of: class airspace information, airspace schedule information, or map information.

20. The method of claim 19, further comprising:
converting metadata for the one or more data sets into a human readable form.

* * * * *